United States Patent
Doyle et al.

(10) Patent No.: US 6,762,765 B2
(45) Date of Patent: Jul. 13, 2004

(54) BANDWIDTH REDUCTION FOR ZONE RENDERING VIA SPLIT VERTEX BUFFERS

(75) Inventors: Peter L. Doyle, El Dorado Hills, CA (US); Thomas A. Piazza, Granite Bay, CA (US)

(73) Assignee: Intel Corporation, Santa Clara, CA (US)

(*) Notice: Subject to any disclaimer, the term of this patent is extended or adjusted under 35 U.S.C. 154(b) by 217 days.

(21) Appl. No.: 10/039,791

(22) Filed: Dec. 31, 2001

(65) Prior Publication Data

US 2003/0122838 A1 Jul. 3, 2003

(51) Int. Cl.$^7$ ................................................. G06F 12/02
(52) U.S. Cl. ....................... 345/565; 345/418; 345/539; 345/564
(58) Field of Search ............................. 345/572, 539, 345/564, 565, 545, 546, 418, 423

(56) References Cited

U.S. PATENT DOCUMENTS 5,696,944 A * 12/1997 Krech, Jr. .................... 345/539
6,344,852 B1 * 2/2002 Zhu et al. .................... 345/418
6,535,209 B1 * 3/2003 Abdalla et al. .............. 345/418

* cited by examiner

*Primary Examiner*—Matthew C. Bella
*Assistant Examiner*—Mackly Monestime
(74) *Attorney, Agent, or Firm*—Sharon Wong (57) ABSTRACT

Embodiments of the present invention provide a split vertex buffer where the data for each vertex is split between parallel vertex buffers. The first buffer contains vertex X and Y data, while the second parallel buffer contains the remainder of the vertex data. Given the split vertex buffers, the hardware binning-engine is now permitted to read and cache only vertex screen X and Y data. Especially given a typically high level of temporal coherency between indexed vertex references, the reading and caching of large parcels of vertex screen-space X and Y leads to lower and highly efficient utilization of memory bandwidth for hardware binning input. Embodiments of the present invention thus reduce the hardware binning memory bandwidth requirements and improve memory utilization.

21 Claims, 5 Drawing Sheets

BANDWIDTH REDUCTION FOR ZONE RENDERING VIA SPLIT VERTEX BUFFERS

BACKGROUND

1. Field

The present invention relates generally to graphics systems and more particularly to graphics-rendering systems.

2. Background Information

Computer graphics systems are commonly used for displaying graphical representations of objects on a two-dimensional video display screen. Current computer graphics systems provide highly detailed representations and are used in a variety of applications. In typical computer graphics systems, an object to be represented on the display screen is broken down into graphics primitives. Primitives are basic components of a graphics display and may include points, lines, vectors and polygons, such as triangles and quadrilaterals. Typically, a hardware/software scheme is implemented to render or draw the graphics primitives that represent a view of one or more objects being represented on the display screen.

The primitives of the three-dimensional objects to be rendered are defined by a host computer in terms of primitive data. For example, when the primitive is a triangle, the host computer may define the primitive in terms of X, Y and Z coordinates of its vertices, as well as the red, green and blue (R, G and B) color values of each vertex. Additional primitive data may be used in specific applications.

Image rendering is the conversion of a high-level object-based description into a graphical image for display on some display device. For example, an act of image rendering occurs during the conversion of a mathematical model of a three-dimensional object or scene into a bitmap image. Another example of image rendering is converting an HTML document into an image for display on a computer monitor. Typically, a hardware device referred to as a graphics-rendering engine performs these graphics processing tasks. Graphics-rendering engines typically render scenes into a buffer that is subsequently output to the graphical output device, but it is possible for some rendering-engines to write their two-dimensional output directly to the output device. The graphics-rendering engine interpolates the primitive data to compute the display screen pixels that represent the each primitive, and the R, G and B color values of each pixel.

A graphics-rendering system (or subsystem), as used herein, refers to all of the levels of processing between an application program and a graphical output device. A graphics engine can provide for one or more modes of rendering, including zone rendering. Zone rendering attempts to increase overall 3D rendering performance by gaining optimal render cache utilization, thereby reducing pixel color and depth memory read/write bottlenecks. In zone rendering, a screen is subdivided into an array of zones and per-zone instruction bins, used to hold all of the primitive and state setting instructions required to render each sub-image, are generated. Whenever a primitive intersects (or possibly intersects) a zone, that primitive instruction is placed in the bin for that zone. Some primitives will intersect more than one zone, in which case the primitive instruction is replicated in the corresponding bins. This process is continued until the entire scene is sorted into the bins. Following the first pass of building a bin for each zone intersected by a primitive, a second zone-by-zone rendering pass is performed. In particular, the bins for all the zones are rendered to generate the final image.

A tile-based graphics architecture like zone rendering requires the screen-space sorting (i.e., binning) of primitives. Each primitive of the scene must be compared to the array of the screen-space zones and replicated into the bin lists associated with intersecting zones. With respect to per-primitive information, this binning requires only the screen-space X and Y positions of the object vertices. However, object vertices typically include other data items, such as Z, W, color and texture coordinates. These other data items are not required for the binning process, yet comprise the majority of the object's per-vertex data and require substantial storage. Conventional implementations require reading complete vertex data given a coarse granularity of memory read accesses. As only the X and Y data are being used, this results in poor memory bandwidth utilization.

What is needed therefore is a vertex buffer configuration that reduces the hardware memory bandwidth requirements and improves memory utilization, particularly for unified memory architecture (UMA) configurations.

DETAILED DESCRIPTION

Embodiments of the present invention provide a split vertex buffer where the data for each vertex is split between parallel vertex buffers. The first buffer contains vertex X and Y data, while the second parallel buffer contains the remainder of the vertex data. Given the split vertex buffers, the hardware binning-engine is now permitted to read and cache only vertex screen X and Y data. Especially given a typically high level of temporal coherency between indexed vertex references, the reading and caching of large parcels of vertex screen-space X and Y leads to lower and highly efficient utilization of memory bandwidth for hardware binning input. Embodiments of the present invention thus reduce the hardware binning memory bandwidth requirements and improve memory utilization.

In the detailed description, numerous specific details are set forth in order to provide a thorough understanding of the present invention. However, it will be understood by those skilled in the art that the present invention maybe practiced without these specific details. In other instances, well-known methods, procedures, components and circuits have been described in detail so as not to obscure the present invention.

Some portions of the detailed description that follow are presented in terms of algorithms and symbolic representations of operations on data bits or binary signals within a computer. These algorithmic descriptions and representations are the means used by those skilled in the data processing arts to convey the substance of their work to others skilled in the art. An algorithm is here, and generally, considered to be a self-consistent sequence of steps leading to a desired result. The steps include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities. Unless specifically stated otherwise as apparent from the following discussions, it is appreciated that throughout the specification, discussions utilizing such terms as "processing" or "computing" or "calculating" or "determining" or the like, refer to the action and processes of a computer or computing system, or similar electronic computing device, that manipulate and transform data represented as physical (electronic) quantities within the computing system's registers and/or memories into other data similarly represented as physical quantities within the computing system's memories, registers or other such information storage, transmission or display devices.

Embodiments of the present invention may be implemented in hardware or software, or a combination of both. However, embodiments of the invention may be implemented as computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a micro-controller, an application specific integrated circuit (ASIC), or a microprocessor.

The programs may be implemented in a high level procedural or object oriented programming language to communicate with a processing system. The programs may also be implemented in assembly or machine language, if desired. In fact, the invention is not limited in scope to any particular programming language. In any case, the language may be a compiled or interpreted language.

The programs may be stored on a storage media or device (e.g., hard disk drive, floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the invention may also be considered to be implemented as a machine-readable storage medium, configured for use with a processing system, where the storage medium so configured causes the processing system to operate in a specific and predefined manner to perform the functions described herein.

Figure 1:
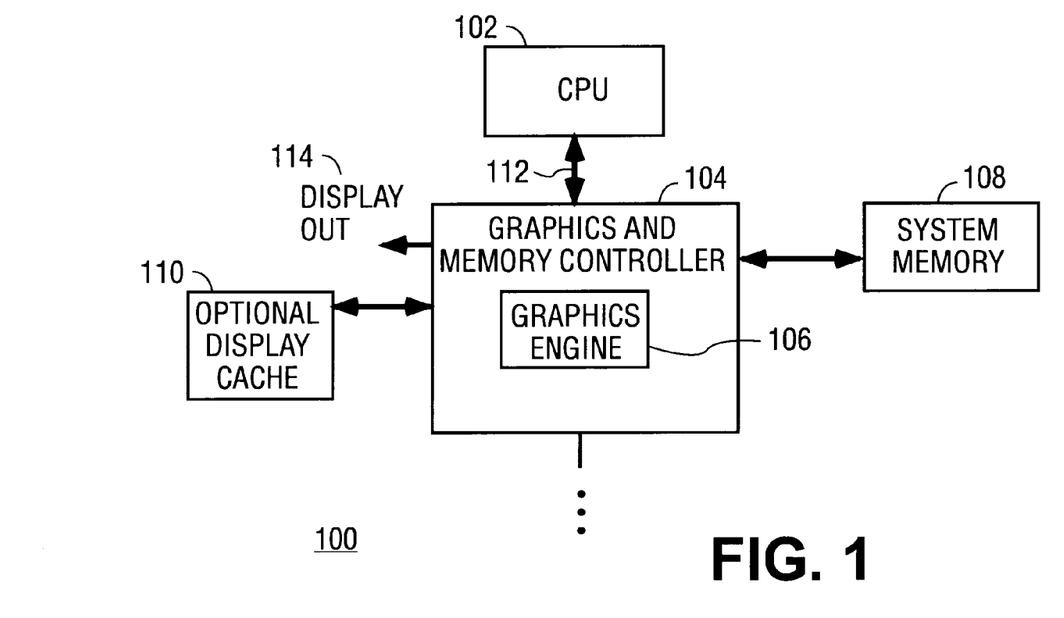
FIG. 1 illustrates a block diagram of an embodiment of a computer system including an embodiment of a graphics device for implementing split vertex buffers for zone rendering.

An example of one such type of processing system is shown in FIG. 1. Sample system 100 may be used, for example, to execute the processing for methods in accordance with the present invention, such as the embodiment described herein. Sample system 100 is representative of processing systems based on the microprocessors available from Intel Corporation, although other systems (including personal computers (PCs) having other microprocessors, engineering workstations, set-top boxes and the like) may also be used. In one embodiment, sample system 100 may be executing a version of the WINDOWS.™. operating system available from Microsoft Corporation, although other operating systems and graphical user interfaces, for example, may also be used.

FIG. 1 is a block diagram of a system 100 of one embodiment of the present invention. The computer system 100 includes central processor 102, graphics and memory controller 104 including graphics device 106, memory 108 and display device 114. Processor 102 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Processor 102 may be coupled to common bus 112 that transmits data signals between processor 102 and other components in the system 100. FIG. 1 is for illustrative purposes only. The present invention can also be utilized in a configuration including a descrete graphics device.

Processor 102 issues signals over common bus 112 for communicating with memory 108 or graphics and memory controller 104 in order to manipulate data as described herein. Processor 102 issues such signals in response to software instructions that it obtains from memory 108. Memory 108 may be a dynamic random access memory (DRAM) device, a static random access memory (SRAM) device, or other memory device. Memory 108 may store instructions and/or data represented by data signals that may be executed by processor 102, graphics device 106 or some other device. The instructions and/or data may comprise code for performing any and/or all of the techniques of the present invention. Memory 108 may also contain software and/or data. An optional cache memory 110 may be used to speed up memory accesses by the graphics device 106 by taking advantage of its locality of access. In some embodiments, graphics device 106 can offload from processor 102 many of the memory-intensive tasks required for rendering an image. Graphics device 106 processes data signals and may be a complex instruction set computer (CISC) microprocessor, a reduced instruction set computing (RISC) microprocessor, a very long instruction word (VLIW) microprocessor, a process implementing a combination of instruction sets, or other processor device, such as a digital signal processor, for example. Graphics device 106 may be coupled to common bus 112 that transmits data signals between graphics device 106 and other components in the system 100, including render cache 110 and display device 114. Graphics device 106 includes rendering hardware that among other things writes specific attributes (e.g. colors) to specific pixels of display 114 and draw complicated primitives on display device 114. Graphics and memory controller 104 communicates with display device 114 for displaying images rendered or otherwise processed by a graphics controller 104. Display device 114 may comprise a computer monitor, television set, flat panel display or other suitable display device.

Memory 108 stores a host operating system that may include one or more rendering programs to build the images of graphics primitives for display. System 100 includes graphics device 106, such as a graphics accelerator that uses customized hardware logic device or a co-processor to improve the performance of rendering at least some portion of the graphics primitives otherwise handled by host rendering programs. The host operating system program and its host graphics application program interface (API) control the graphics device 106 through a driver program.

Figure 2:
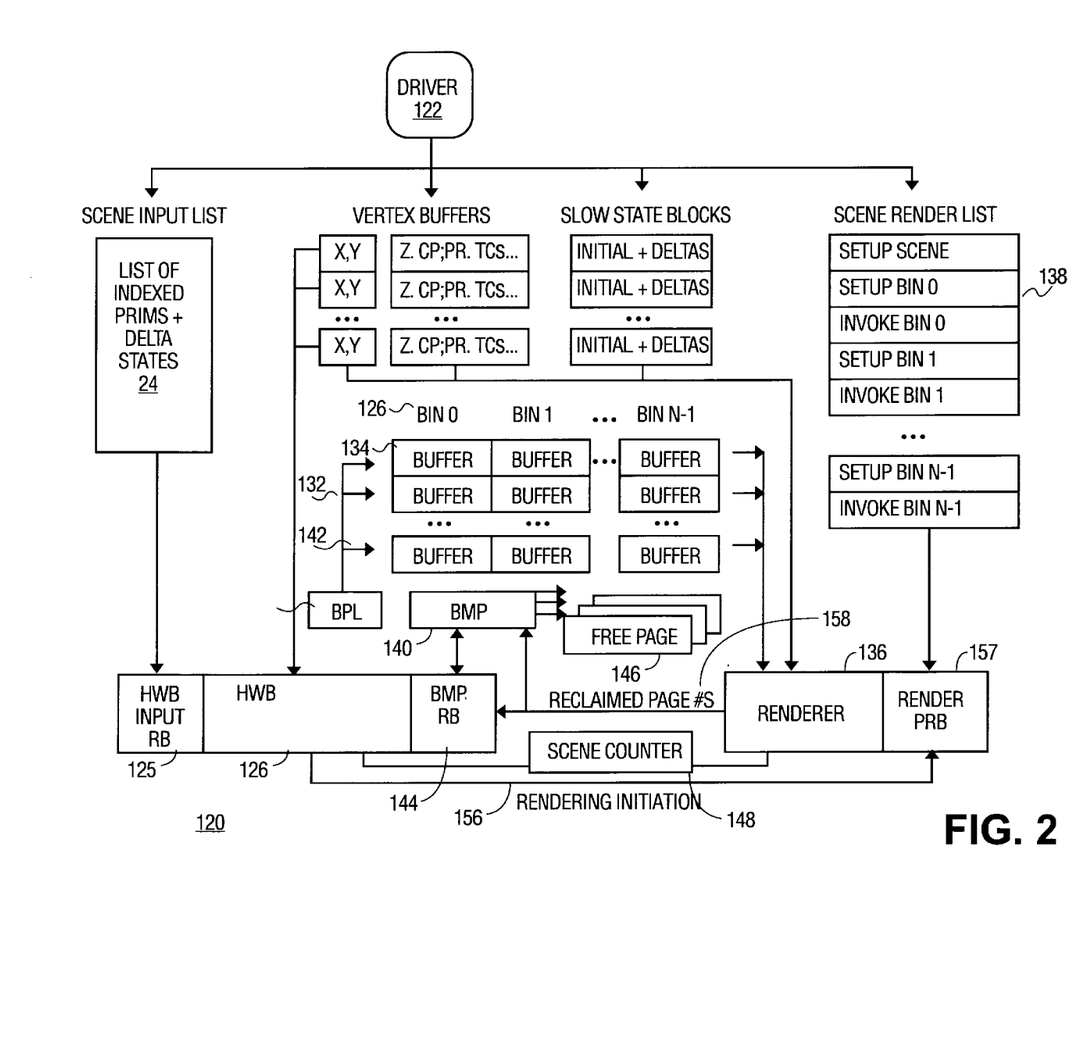
FIG. 2 illustrates a block diagram of an embodiment of a graphics device including a graphics-binning engine, vertex buffers including a buffer including only vertex X and Y data, graphics-rendering engine and bins.
Figure 3:
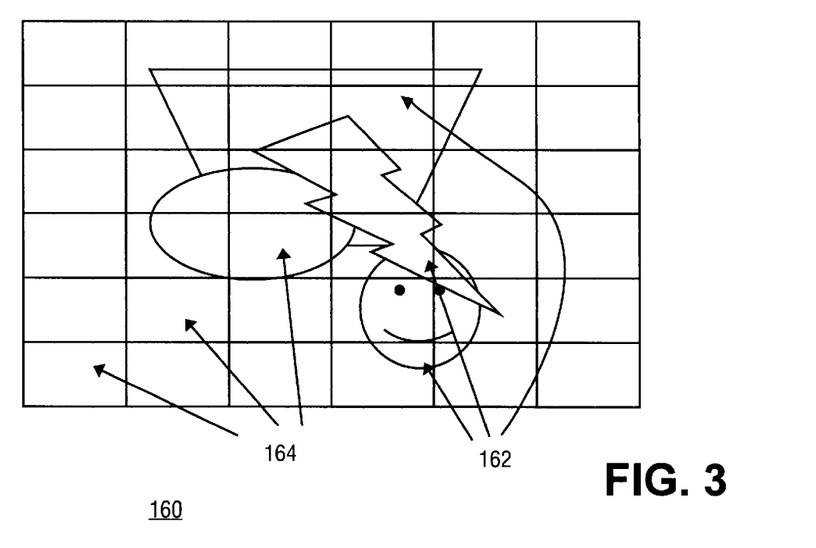
FIG. 3 illustrates a depiction of an embodiment of a zone renderer screen view including zones and geometrical primitives.

FIG. 2 illustrates a block diagram of an embodiment 120 of a graphics device including a graphics-binning engine 120, vertex buffers 150 including first buffer 152 including only vertex X and Y data, graphics-rendering engine 136 and bins 128. FIG. 3 illustrates an embodiment 160 of various screen objects implemented on a zone rendering system 120 (shown in FIG. 2) is illustrated. Referring to FIGS. 2 and 3, a screen object to be presented on the display screen is broken down into graphics primitives 162. Primitives 162 may include, but are not limited to, graphical objects such as polygons (e.g., triangles and quadrilaterals), lines, points and vectors. The graphics engine 106 is implemented to render, or draw, the graphics primitives 162 that represent a view of one or more screen objects being represented on the display screen. In zone rendering, a screen is subdivided into an array of zones 164 commonly screen-space rectangles although other geometric variants may be used as well. Each zone 164 is associated with a bin. Each bin 128 includes a chained series of command buffers 134 stored within non-contiguous physical memory pages. The bins 128 are thus preferably implemented as a chain of independent physical pages.

When a primitive 162 intersects a zone 164, the corresponding primitive instruction is placed in the bin 128 associated with the zone 164 intersected. Per-zone instruction bins 128 are thus used to hold primitive instructions and state-setting instructions required to render each sub-image and are generated by comparing the screen-space extent of each primitive 162 to the array of zones 164. Thus, as the primitives 162 are received, the present invention determines which zone(s) 164 each primitive 162 intersects, and replicates the primitive instructions into a bin 128 associated with each of these zones 164.

The process of assigning primitives (and their attributes) 162 to zones 164 is referred to as binning. "Bin" 128 refers to the abstract buffer used for each zone—where a bin 128 will typically be realized as a series of instruction batch buffers 134. Binning performs the necessary computations to determine what primitives 162 lie in what zones 164 and can be performed by dedicated hardware and/or software implementations.

In one typical implementation, a driver 122 writes out a set of primitive instructions to be parsed by the graphics-binning engine 126. In particular, the information necessary for primitive binning is stored in vertex buffers 150, which includes first buffer 152 and second buffer 154. As discussed in detail below, first buffer 150 stores vertex X and Y data, while second buffer 154 contains the remainder of the vertex data. For each zone 164 intersected by a primitive 162, the graphics-binning engine writes corresponding primitive instructions into buffers 134 associated with the zones 164 intersected. Given the split vertex buffers 152 and 154, graphics binning-engine 126 is now permitted to read and cache only vertex screen X and Y data from first buffer 150. Some primitives 162 will intersect more than one zone 164, in which case the primitive instruction is replicated in bins 128 corresponding to the intersected zones 164. For example, the lightning bolt depicted in FIG. 3 intersects nine zones 164. This process is continued until the entire scene is sorted into bins 128.

Referring to FIG. 2, in a typical implementation, a graphics primitive and state-setting instruction stream, referred to as a scene input list 124, is initially applied to graphics-binning engine ring buffer 125 associated with graphics-binning engine 126. The scene input list 124 may be a single, temporally-ordered scene description as received by the application programming interface (API). Graphics-binning engine 126 is typically implemented as a hardware binning engine (HWB) 126. One skilled in the art will recognize that a software or software plus hardware binner could be used as well. The graphics-binning engine 126 parses scene input list 124 and determines which zone(s) 164 each primitive 162 intersects.

As previously noted, the zones 164 are associated with bins 128. Graphics-binning engine 126 compares the screen-space extent of each primitive 162 to the array of zones 164, and replicates the associated primitive commands into corresponding bins 128. Bins 128 are comprised of chained series of command buffers 134 typically stored within non-contiguous physical memory pages. A bin list is a list of buffers 134 which comprise each bin 132. Pages are initially allocated to the bin memory pool (BMP) 140. The bin pointer list 130 is initialized with the page numbers of the pages and stores write pointers into each bin list 132.

The graphics-binning engine 126 also maintains the current graphics state by parsing associated state-setting instructions contained with the scene input list 124. Prior to placing a primitive command in any given bin 128, the graphics-binning engine 126 typically precedes the primitive command in the bin 128 with any required state-setting instructions.

After the scene input list 124 has been completely parsed, the associated bins (i.e. bin 0, bin 1 . . . bin n-1) are ready to be used by the graphics-rendering engine 136 to render the scene. As discussed in detail below, instructions are included at the end of the scene input list 124 to cause the graphics-binning engine 126 to increment the register in pending scene counter 148 by one and initiate rendering of the binned scene. For example, graphics-binning engine 126 sends a render instruction to graphics-rendering engine ring buffer 157 associated with graphics-rendering engine 136 via path 156.

Once all the primitives 162 are sorted and the command structures completed, a second pass is made to render the scene one zone 164 at a time. Following the first pass of building a bin for each zone 164 intersected by a primitive 162, a second zone-by-zone rendering pass is performed. In particular, the bins 128 for all the zones 164 are rendered to generate the final image, with each scene rendered one zone 164 at a time. The order with which the zones 164 are rendered is typically not significant. All bins 128 associated with primitives 162 that touch pixels within a particular zone 164 are rendered before the next zone 164 is rendered. A single primitive 162 may intersect many zones 164, thus requiring multiple replications. As a result, primitives 162 that intersect multiple zones 164 are rendered multiple times (i.e. once for each zone 164 intersected).

Rendering performance improves as a result of the primitives 162 being sorted by their intersection with zones 164 that are aligned to the render cache 110. Since the graphics device 106 is only working on a small portion of the screen at a time (i.e. a zone 164), it is able to hold the frame buffer contents for the entire zone 164 in a render cache 110. The dimensions of the zone 164 are typically a constant tuned to the size and organization of the render cache 110. It is by this mechanism that the render cache 110 provides optimal benefits-reuse of cached data is maximized by exploiting the spatial coherence of a zone 164. Through use of the zone rendering mode, only the minimum number of color memory writes need be performed to generate the final image one zone 164 at a time, and color memory reads and depth memory reads and writes can be minimized or avoided altogether. Use of the render cache 110 thus significantly reduces the memory traffic and improves performance relative to a conventional renderer that draws each primitive completely before continuing to the next primitive.

Figure 4:
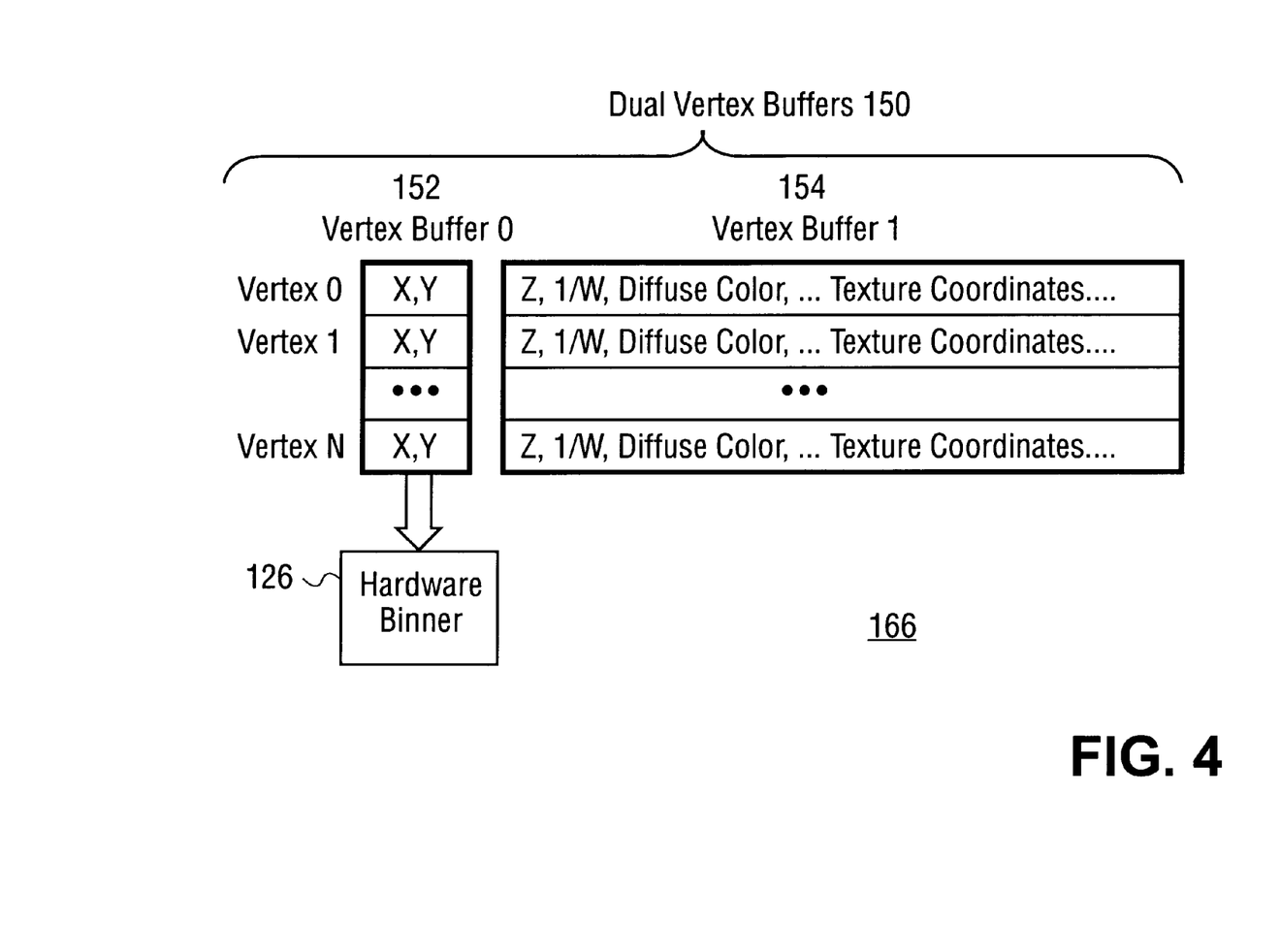
FIG. 4 illustrates a block diagram of an embodiment of a split vertex buffer.

FIG. 4 illustrates a block diagram of an embodiment 160 of a split vertex buffer 150 including first and second buffers 152 and 154. In particular, the data for each vertex is split between parallel vertex buffers 152 and 154. First buffer 152 contains predefined vertex data, such as vertex X and Y data, while second parallel buffer 154 contains the remainder of the vertex data. In particular, the X and Y data represents the X and Y screen display pixels for each primitive vertex and separated and buffered in first buffer 152. The remaining vertex data includes, but is not limited to, Z, 1/w, color, and texture coordinates. Given the split vertex buffers 152 and 154, graphics binning-engine 126 is now permitted to read and cache only vertex screen X and Y data. Especially given a typically high level of temporal coherency between indexed vertex references, the reading and caching of large parcels of vertex screen-space X and Y leads to lower and highly efficient utilization of memory bandwidth for hardware binning input. Hardware binning memory bandwidth requirements are reduced and memory utilization improved.

Vertex buffers 152 and 154 are defined via a vertex buffer instruction. In particular, vertex buffer is a rectangular array of memory used to hold an array of 3D vertex data. The rows of the array are accessed via indices contained in "indirect-data" forms of 3D primitive instructions. These instructions access the vertex array in either a random fashion (with an explicit index per vertex) or a sequential fashion (with a starting index and count). Once the primitive assembly stage reads the vertex data from the vertex buffer(s), the primitives are subsequently processed as if the data was provided "inline."

The rectangular memory region associated with each vertex buffer 152 and 154 is defined by a starting address (VertexBuffer[ ]Address, Dword-aligned) and a pitch (VertexBuffer[ ]Pitch, in Dwords). The definition of valid data (data to be accessed) in the vertex buffer 152 and 154 is defined by a width (VertexBuffer[ ]Width, in Dwords), where the valid data is left-justified in the rectangular buffer. The memory regions associated with these vertex buffers 152 and 154 can overlap. The use of each vertex buffer 152 and 154 is controlled via an enable (VertexBuffer[ ]Enable). At any time, zero, one or two buffers can be enabled. For each primitive vertex data, vertex mapping logic determines the appropriate buffer to store the data in. X and Y data is buffered in first buffer 152 while the rest of the vertex data is buffered in second buffer 154.

Figure 5:
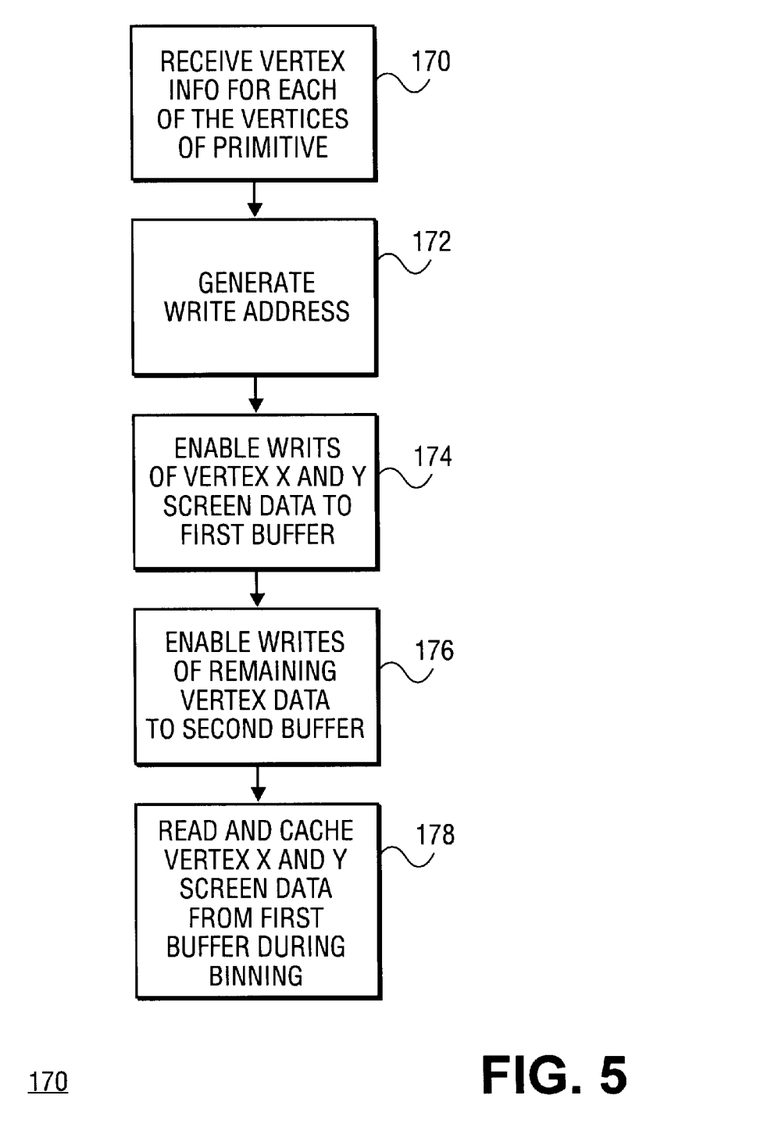
FIG. 5 illustrates a flow diagram of an embodiment of a binning process including use of split vertex buffers.

FIG. 5 illustrates a flow diagram of an embodiment 170 of a process for utilizing split vertex buffers for binning. The process to transfer vertex information representative of graphics primitives initially receives vertex information from a host computer into a memory area, the vertex information including but not limited to, for each of the vertices of a primitive, vertex data and a vertex address corresponding to the vertex data (step 172). The vertex data represents parameters for each vertex.

A write address is then generated for the memory area in response to the vertex address (step 172). Responsive to the write address and to a select signal, writes of selected vertex data to the first buffer and writes of remaining vertex data to the second buffer are enabled (step 174). In particular, writes of selected vertex X and Y screen data to the first buffer are enabled. Reads and caches of the selected vertex data from the first buffer are then enabled during binning (step 178). As previously noted, the graphics-binning engine accesses only the first buffer for selected binning operations.

Having now described the invention in accordance with the requirements of the patent statutes, those skilled in the art will understand how to make changes and modifications to the present invention to meet their specific requirements or conditions. Such changes and modifications may be made without departing from the scope and spirit of the invention as set forth in the following claims.

What is claimed is:

1. An apparatus transfer of vertex information representative of graphics primitives between a host computer and processing device, comprising:
   a memory area to receive the vertex information from the host computer, the vertex information including, for each of the vertices of a primitive, vertex data and a vertex address corresponding to the vertex data, the vertex data representing parameters for each vertex, wherein the memory area includes a first and second buffer;
   address generation device responsive to the vertex address to generate a write address for the memory address; and
   a control circuit, responsive to the write address and to a select signal, to enable writes of selected vertex screen data associated with a selected vertex to the first buffer and writes of remaining vertex data associated with the same selected vertex to the second buffer, wherein the control circuit also enables the processing device reads of the selected vertex screen data from the first buffer.

2. The apparatus of claim 1 wherein the selected vertex data comprises vertex X and Y screen data.

3. The apparatus of claim 1 wherein the processing devices comprises:
   a binning engine to read vertex X and Y screen data from the first buffer.

4. The apparatus of claim 3 wherein the binning engine caches vertex X and Y screen data from the first buffer.

5. The apparatus of claim 1 wherein the processing devices comprises:
   a rendering engine to access only vertex X and Y screen data from the first buffer.

6. An apparatus to process graphical primitives, comprising:
   a plurality of binning memory areas associated with regions that are intersected by graphical primitives;
   a vertex memory area to receive vertex information associated with the primitives, the vertex information including, for each of the vertices of a primitive, vertex data and a vertex address corresponding to the vertex data, the vertex data representing parameters for each vertex, wherein the memory area includes a first and second buffer;
   address generation device responsive to the vertex address to generate a write address for the memory address;
   a control circuit, responsive to the write address and to a select signal, to enable writes of selected vertex screen data associated with a selected vertex to the first buffer and writes of remaining vertex data associated with the same selected vertex to the second buffer, wherein the control circuit also enables reads of the selected vertex screen data from the first buffer; and a binning engine to receive the graphical primitives, wherein the binning engine reads the selected vertex data from the first buffer and caches the selected vertex data into at least one of the plurality of binning memory areas.

7. The apparatus of claim 6 further comprising:

a rendering engine for rendering the graphical primitives in the plurality of binning memory areas.

8. The apparatus of claim 6 wherein the selected vertex data comprises vertex X and Y screen data.

9. The apparatus of claim 8 wherein the binning engine reads vertex X and Y screen data from the first buffer.

10. The apparatus of claim 9 wherein the binning engine caches vertex X and Y screen data from the first buffer.

11. The apparatus of claim 10 wherein the rendering engine accesses vertex X and Y screen data from the first buffer.

12. A method to transfer vertex information representative of graphics primitives, comprising:

receiving the vertex information from a host computer into a memory area, the vertex information including, for each of the vertices of a primitive, vertex data and a vertex address corresponding to the vertex data, the vertex data representing parameters for each vertex;

generating a write address for the memory area in response to the vertex address; and responsive to the write address and to a select signal, enabling writes of selected vertex screen data associated with a selected vertex to the first buffer and writes of remaining vertex data associated with the same selected vertex to the second buffer, and enabling reads of the selected vertex screen data from the first buffer.

13. The method of claim 12 wherein enabling writes of selected vertex data to the first buffer further comprises:

selecting vertex X and Y screen data.

14. The method of claim 12 further comprising reading vertex X and Y screen data from the first buffer during binning.

15. The method of claim 13 further comprising caching vertex X and Y screen data from the first buffer during binning.

16. The method of claim 1 wherein the processing devices access only the first buffer for selected binning operations.

17. A machine readable medium having stored therein a plurality of machine readable instructions executable by a processor to transfer vertex information representative of graphics primitives, the machine readable instructions comprising:

instructions to receive the vertex information from a host computer into a memory area, the vertex information including, for each of the vertices of a primitive, vertex data and a vertex address corresponding to the vertex data, the vertex data representing parameters for each vertex;

instructions to generate a write address for the memory area in response to the vertex address; and responsive to the write address and to a select signal, instructions to enable writes of selected vertex screen data associated with a selected vertex to the first buffer and writes of remaining vertex data associated with the same selected vertex to the second buffer, and enable reads of the selected vertex screen data from the first buffer.

18. The machine readable medium of claim 17 wherein instructions to enable writes of selected vertex data to the first buffer further comprises:

instructions to select vertex X and Y screen data.

19. The machine readable medium of claim 17 further comprising instructions to read vertex X and Y screen data from the first buffer during binning.

20. The machine readable medium of claim 18 further comprising instructions to cache vertex X and Y screen data from the first buffer during binning.

21. The machine readable medium of claim 17 wherein the processing devices access only the first buffer for selected binning operations.

* * * * *